United States Patent [19]

Soumagne

[11] 4,331,837
[45] May 25, 1982

[54] SPEECH/SILENCE DISCRIMINATOR FOR SPEECH INTERPOLATION

[76] Inventor: Joël Soumagne, 2560 rue Troyes, Sherbrooke, Quebec, Canada, J1K 2R1

[21] Appl. No.: 125,532

[22] Filed: Feb. 28, 1980

[30] Foreign Application Priority Data

Mar. 12, 1979 [FR] France .................. 79 06670

[51] Int. Cl.³ .................................. H04J 6/02
[52] U.S. Cl. .................................. 179/1 SC
[58] Field of Search ............... 179/1 SC, 1 SD, 1 SB, 179/1 VC, 1 P, 1 CN, 1 HF; 370/79, 81, 118; 455/218, 222

[56] References Cited

U.S. PATENT DOCUMENTS

| 3,873,926 | 3/1975 | Wright | 179/1 VC |
|---|---|---|---|
| 4,028,496 | 6/1977 | La Marche et al. | 179/1 SC |
| 4,044,309 | 8/1977 | Smith | 179/1 SC |
| 4,052,568 | 8/1977 | Jankowski | 179/1 VC |

FOREIGN PATENT DOCUMENTS

1516100  6/1978  United Kingdom ............ 179/1 SC

Primary Examiner—Mark E. Nusbaum
Assistant Examiner—E. S. Kemeny
Attorney, Agent, or Firm—Laff, Whitesel, Conte & Saret

[57] ABSTRACT

The speech/silence discriminator is used on a telephone line to distinguish between periods of speech and periods of silence. A signal derived from the speech signal is, in the speech state compared to an adaptive threshold which is a fraction of the maximum, to be eventually quantized, reached by said signal during the period of speech which is considered; the speech to silence transition being determined when the signal decreases below said threshold level, the threshold level being determined during each speech period as a function of the maximum attained during the period. The adaptive threshold has a minimum value of −60 dBm. It is also comprised of a noise level evaluation circuit which determines the threshold decision level (≧ −60 dBM) for the transition from silence to speech which once reached, in the period of silence, enables the discriminator to go from the silent state to the speech state. It is useable in speech interpolation systems.

5 Claims, 13 Drawing Figures

FIG.1

FIG.2 — AVERAGING FILTER FIXED WINDOW

FIG.3 — AVERAGING FILTER VARIABLE WINDOW

FIG.4 — THRESHOLD CIRCUIT

FIG.5 — INITIALIZING CIRCUIT

DYNAMICS OF SPEECH AND NOISE

FIG.7

|s|
100ms

|a|
200ms

DYNAMICS OF SPEECH AND NOISE

THRESHOLD OPERATION

FIG.9

HIGH NOISE LEVEL RESPONSE

FIG.11

FLOW CHART OF OPERATION

FIG.12

FLOW CHART OF OPERATION

SPEECH/SILENCE DISCRIMINATOR FOR SPEECH INTERPOLATION

The present invention is related to a silence detector, possibly including a circuit to evaluate the background noise level, which can be used for instance in telephone concentration transmission systems using speech interpolation.

Concentration by interpolation of speech consists of using rest periods in conversation to assign the channel, during these rest periods, to conversations in active periods. This technique is used in the system known under the name TASI (Time Assignment Speech Interpolation) and on this subject we can refer to the technical publication "Engineering Aspects of TASI" by K. Bullington and J. M. Fraser published in the American Journal "Bell System Technical Journal", Vol. 38, 1959, pp. 353–364.

In such concentrating by speech interpolation systems, use is made of speech detectors and silence detectors or as well speech/silence discriminators to locate, on each circuit, the change in activity and rest and thus to break down the speech into fragments of conversation. A controlling element is attached to each fragment, depending on the state of the corresponding speech/silence discriminator, one channel among many, and a signalling element transmits to the distant receiving station the switching carried out in the transmission station in order that the receiving station should repeat them.

In known speech interpolation systems, no account is taken of silences during listening periods and pauses shorter than 250 milliseconds. As well, in speech we meet inter-word or intersyllabic silences of very short duration which, when we talk, occupy a non-negligible portion of time.

One object of the present invention consists of providing a digital speech/silence discriminator capable of accounting for inter-word and intersyllabic silences in speech interpolation systems resulting in a more efficient use of the channel.

In classical speech detectors, the envelope of the signal is compared to a predetermined threshold level which does not permit distinguishing certain unvoiced sounds from noise. However, to avoid sharp cut-off of speech, a delay circuit is used which maintains the active state while the envelope of the signal has already decreased below the threshold level. The delay (hangover time) of the circuit is of the order of 250 ms., the time required to recover the intersyllabic silences, which thus cannot be used.

In the technical paper "Digital Dynamic Speech Detectors" by P. G. Drago et al, published in the Americal Journal "IEEE Transactions on Communications", Vol. COM-26, No. 1, January 1978, pp. 140–145, a description is given of two other types of speech detectors, called dynamic speech detectors in which the decision function uses the relative variations in the signal envelope. However, in these detectors, the signals derived from the speech signal are always compared to fixed threshold levels, which gives a certain rigidity to the system. A delay time (hangover time) must be provided for the speech to silence transition, this time being of the order of 250 ms. Thus no use can be made of the interword and intersyllabic silences.

According to one feature of the present invention, a speech/silence discriminator is provided in which the signal derived from the speech signal is, in the speech state, compared to a threshold which is a fraction of the maximum, eventually quantized, reached by said derived signal during the speech period considered, the speech to silence transition being decided when said derived signal decreased below the threshold level, the threshold level being determined during each speech period as a function of the maximum attained during that period.

As another feature of the invention, the threshold called adaptive threshold has a minimum value corresponding to a minimum threshold.

However, we know that on one channel there always exists background noise resulting from for example stage noise at the sound pickup or electronic noise due to the equipment used. In known silence detectors, no account is made of the mean level of the background noise to determine the thresholds which are fixed by other considerations.

Another object of the present invention consists of providing a speech/silence discriminator which is comprised of a noise level evaluation circuit, the level of which determines the silence-speech transition decision threshold, which cannot be lower than said reference basic minimum, which when reached during a silence period by the signal derived from the signal applied to the discriminator causes the discriminator to pass from the silence state to the speech state.

It is thus apparent that the discriminator in this invention uses a first threshold for transition from speech to silence which is adaptive and which is used to decide the transition to the silence state, when the discriminator is in the speech state, and a second threshold for transition from silence to speech which is determined by the noise level and which is used to decide the transition to the speech state when the discriminator is in the silence state.

Of course, for most of the links where use is made of a concentration technique for speech interpolation, the noise level is of the order corresponding to the minimum reference threshold. However, in the case of considerable noise it is possible that the noise level can exceed the largest adaptive speech-silence threshold, the speech state thus becoming permanent, which would also be the case with the known silence detectors.

As another feature of the present invention, the speech-silence discriminator is comprised of a first wideband filter which has its input connected to the input of a discriminator and which has its output connected to the first input of a switch, a second narrow band filter which has its input connected to the input of a discriminator and which has its output connected to the second input of said switch, said narrow band second filter having one zero resetting input connected to the "1" state output of a two state circuit, a third filter with variable bandwidth having its input connected to the input of the discriminator and its output connected to the input of a first quantization circuit the output of which is connected to the input of a divider whose output is connected to an input of a second switch which has its other input connected to the output of a memory with the reference minimum, the third filter having an input for presetting the maximum bandwidth connected to the state "0" output of the said two state circuit, the output of the first switch being connected to the the first input of a first comparator and the output of the second switch being connected to the second input of the said first comparator the output of which is connected to the input of said two state status change circuit, the "1" output activated indicating the silent state, connecting the output of the second filter to the output of the first switch and connecting the memory's output to the output of the second switch and for state "0" output activated, indicating the speech state, connecting the output of the first filter to the output of the first switch and the output of the divider to the output of the second switch, the bandwidth of the third filter decreasing with time to a minimal bandwidth after its setting to the maximum bandwidth with each activation of the "0" output state.

According to another feature, the discriminator is also comprised of a noise level evaluation circuit the output of which is connected to the second input of a second comparator, when the level of its output exceeds that of said memory.

According to another feature the output of the said noise level evaluator is also connected to the first input of the second switch when its output level exceeds the level of the said divider.

As another feature, the said noise level evaluator has a fourth filter having a relatively narrow band and which has its input connected to the input of the discriminator and which has its output connected to the input of a second quantization circuit the output of which is connected on one hand to the first input of a second comparator and on the other hand to the input of a multiplier whose zero resetting is connected to the "1" state output, a fifth very narrow band filter which has its input connected to the input of the discriminator and which has its output connected to the input of a third quantizer the output of which is connected to the second input of said second comparator, a second memory whose input is connected to the output of said second comparator and whose output constitutes the output of said noise level evaluator, the output of the said multiplier being connected to the input of said fifth filter as long as said two state circuit is in the "0" state and being disconnected when in the other "1" state, the said second comparator having one activation input which is connected to the "0" state output.

According to another feature, said third filter and said fourth filter consists of a single device, as is also the case with the first and second quantizer.

According to another feature, the fraction defining the adaptive threshold for the speech-silence transition corresponds to an attenuation of 42 dB.

According to another feature the reference minimum thresold is fixed at −60 dBM, that is, −60 dB below the maximum coding level.

According to another feature, the filters are digital averaging filters.

According to another feature, said first filter is an averaging filter operating on 2 digital samples.

According to another feature, the said second filter is an averaging filter operating on 64 samples.

According to another feature, the said third filter is an averaging filter operating on a number of samples varying between 2 and 64 over a time duration of the order of one excitation period of a vocal sound.

According to another feature, said fifth filter is an averaging filter operating on 1024 samples.

The features of the present invention which are mentioned above, as well as others, will become clearer upon reading the description of examples of embodiments; the description is made in conjunction with the attached drawings, in which.

Figure 1:
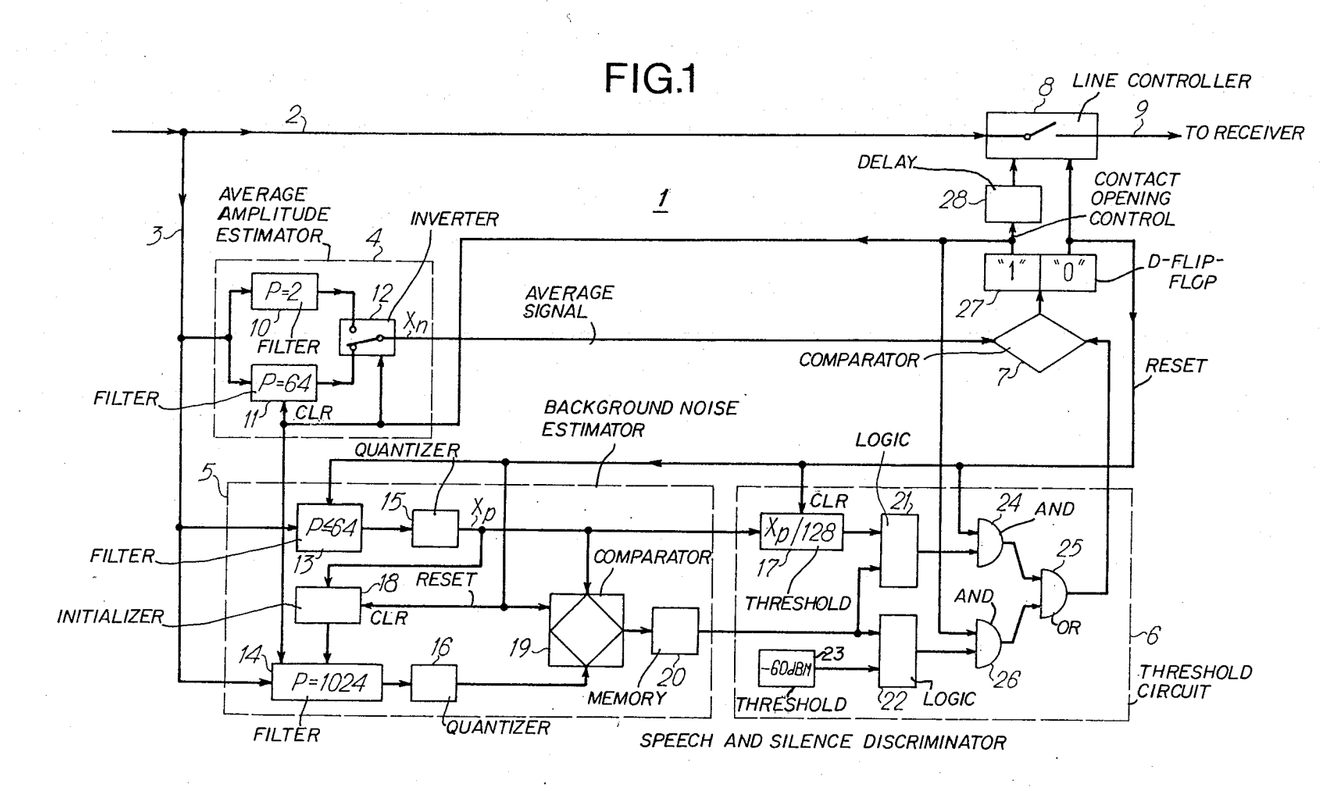
FIG. 1 is a block diagram of a speech and silence discriminator, according to the invention.

The speech and silence discriminator of FIG. 1 is shown connected to the unidirectional transmission line 2 by a tap 3, receiving the transmitted signals via 2, that we presume, in our example embodiment, to be digital signals, representing in a linear scale with 12 binary digits or "bits" samples of a voice signal, more or less disturbed by noise. The digital signal with 12 bits can be produced by a digital conversion circuit from a logarithmically scaled PCM digital signal. The linear scale conversion allows such processing as addition and division on the digital signals.

Tap 3 is connected to the input of an average amplitude estimation circuit 4 and to the input of a background noise level estimation circuit 5. The discriminator is then completed by a threshold selection circuit 6 and a comparator 7 which has its output connected to a control mechanism 8, allowing the received signals on line 2 to pass or not to pass on link 9 to a receiver station.

The average amplitude estimation circuit 4 is comprised of, with their inputs in parallel, two averaging filters 10 and 11, the first having a bandwidth appreciably wider than the second. The output of filter 10 is connected to the make contact of an inverter 12 while the output of filter 11 is connected to the break contact of 12 whose moving contacts deliver the average signals Xn and is connected to the first input of comparator 7.

The background noise level estimation circuit 5 is comprised of two averaging filters 13 and 14 with paralleled inputs, the first filter having a bandwidth comparable to that of filter 11 and the second with a bandwidth considerably smaller. The outputs of filters 13 and 14 are respectively connected to the quantizers 15 and 16. The output of 15 is connected, on one hand to the input of an adaptive threshold generation circuit 17 of the threshold selection circuit 6 and on the other hand to the input of the initialization circuit 18 and finally to the first input of comparator 19. The output of 16 is connected to the second input of comparator 19 whose input is then connected to the input of a memory 20. The output of circuit 18 is connected to the initialization input of the averaging filter 14.

The threshold selection circuit 6 is comprised of an adaptive threshold generation circuit 17, already mentioned, whose output is connected to the first input of a logical circuit 21, whose second input is tied to the output of memory 20. The output of 20 is also connected to the first input of another logic circuit 22 whose second input is tied to the output of a minimum threshold level memory 23. The output of logic circuit 21 is connected to the first AND gate 24 whose output is connected to the first input of OR gate 25. The output of logic circuit 22 is connected to the first input of AND gate 26 whose output is then connected to the second input of OR gate 25. The output of OR gate 25 is connected to the second input of comparator 7.

The output of comparator 7 is connected to the input of a D type flip flop 27. The output 1 of 27 is connected, in parallel, to the opening control input of circuit 8, through a delay circuit 28 to the rest control input of inverter 12, to the initialization input of averaging filter 11, to the initialization release input of averaging filter 14, and to the second input of AND gate 26. The output "0" of 27 is connected, in parallel, to the initialization input of averaging filter 13, to the zero resetting CLR (RAZ) input of circuit 17, to the zero resetting CLR (RAZ) input of circuit 18, to the trigger input of comparator 19, to the closure command input of circuit 8, and to the second input of AND gate 24.

In circuit 8, we have represented a make contact showing that in a period of silence (or an open state) the signals from 2 are not transmitted to 9, which corresponds to the case where the "1" output of 27 is active. During a period of speech (or a closed state), signals are transmitted, which corresponds to output "0" being active.

Before describing the operation of the discriminator of FIG. 1, we shall first give more details concerning circuits being used.

Figure 2:
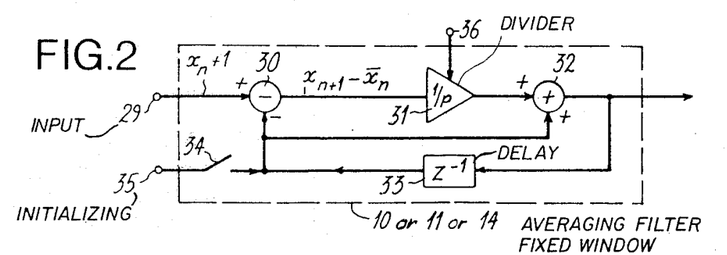
FIG. 2 is a block diagram of an averaging filter of fixed window width, used in the discriminator of FIG. 1.

The averaging filters 10, 11 and 14 are of the type of averaging filter shown in FIG. 2. In these filters an average of the amplitude of a signal is computed over a fixed period of time, which fixed time can primarily be expressed by a fixed number of terms, that is to say that digital signal applied to the filter, have their average computed. Thus, being given a series of $x_i$ terms, the average of P terms from $x_n$ to $x_{n+p-1}$ will be $$\overline{x}_1 = 1/P(x_n + x_{n+1} + x_{n+2} + \ldots + x_{n+p-1}) \quad (1)$$

If at the next sampling time, one shifts the analysis time or what is referred to as the window by one rank, the new average $\overline{x}_2$ can be obtained by adding the new factor $x_{n+p}$ and dropping the old factor $x_n$, giving $$\overline{x}_2 = \overline{x}_1 + (1/P)(x_{n+p} - x_n) \quad (2)$$

In practice, for the use of the averages which are made in the discriminator of this invention, we can allow certain computation simplifications, since the computation of formula (2) evidently necessitates retention of P terms in memory. It is therefore proposed, in formula (2), to replace $x_n$ by $\overline{x}_1$, which gives us:

$$\overline{x}_2 = \overline{x}_1 + 1/P(x_{n+p} - \overline{x}_1) \quad (3)$$

This transformation suggests that knowing $\overline{x}_1$ for P terms, each term can be replaced by one value $\overline{x}_1$, and that the new factor $x_{n+p}$ will modify the previous average.

The circuit of FIG. 2 is comprised of an input 29 to which is applied either the digital signal $x_n$, or the present signal x. Input 29 is connected to the + input of a subtractor 30 whose output is connected to the input of divider 31, with a division ratio of P. The output of 31 is connected to the first input of adder 32, whose output, on one hand, consists of the output of the averaging filter and, on the other hand to the input of the delay circuit 33. The delay produced by 33 is equal to one input signal sampling period, which is classically indicated by $z^{-1}$ in the block showing the circuit. The output of 33 is connected on one hand to the − input of subtractor 30 and, on the other hand, to the second input of adder 32. As a means of tapping the output of 33 a make contact 34 is provided which is open during computation time, but at initialization time permits the application to the filter of an initial average value provided by input 35.

If we call the signal obtained from the delay circuit 33 $\overline{x}_1$, we have, at the output of subtractor 30, the signal $x - \overline{x}_1$. After dividing by P in 31, we obtain a signal $1/P(x - \overline{x}_1)$ which is added to $\overline{x}_1$, in adder 32 which then delivers the signal $\overline{x}_2$, conforming with formula (3).

One can show that an averaging filter such as that of FIG. 2 is a low-pass digital filter of order 1 and of gain $G = 1 - 1/p$, with P being an integer. A window of width P is therefore equivalent to filtering with a time constant RC, such as:

$$e^{-T/RC} = G = 1 - 1/P \quad (4)$$

or $$RC = T/(P)/\ln(P-1) \quad (5)$$

and $RC \approx TP$ when $T << RC$

Therefore, with $T = 125$ microseconds, which corresponds to one sampling time period in a PCM transmission system, and P variable, we will have a cut-off frequency $f_c = 1/2\pi RC$ and obtain the following table

| P | 2 | 4 | 8 | 16 | 32 | 64 | 128 |
|---|---|---|---|---|---|---|---|
| $RC_{ms}$ | 0.875 | 0.92 | 1 | 2 | 4 | 8 | 16 |
| $f_{cHz}$ | 600 | 180 | 160 | 80 | 40 | 20 | 10 |
| P | 256 | 512 | 1024 | 2048 | | | |
| $RC_{ms}$ | 32 | 64 | 128 | 256 | | | |
| $f_{cHz}$ | 5 | 2.5 | 1.25 | 0.06 | | | |

As was mentioned above, the digital words x applied to tap 3, that is to the inputs of filters 10, 11 and 14 are 12 bit words on a linear scale. Thus, if we choose, as in the above table, only numbers P which are powers of 2 to define the width of the window, the divisions of divider 31 of each averaging filter is simply a right shift in a register.

In FIG. 2, we have once again shown one control input 36 through which we can control the number of shifts in the dividing register 31 for the case we consider now and later, where P is a power of 2.

Figure 3:
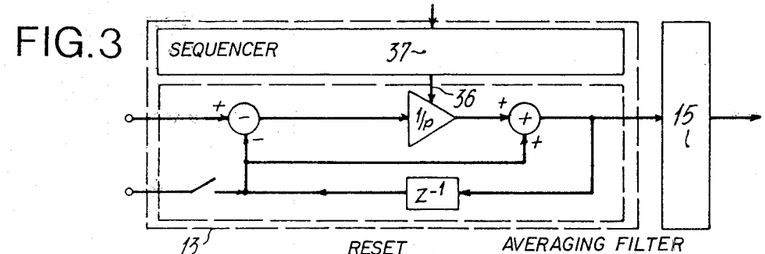
FIG. 3 is a block diagram of an averaging filter of variable window width, used in the discriminator of FIG. 1.

FIG. 3 represents an averaging filter with a window of variable width, that is with a variable bandwidth. In a preferred example of the invention, the averaging filter 13 is of this type. In it are the same components as in the filter of FIG. 2 but additionally, the input 36, defining P, is connected to the output of a sequencer 37 which allows for variations in P, estimated to be a power of 2, at the sampling rate. We shall see later the reason for such a filter with variable bandwidth.

The output of filter 13 is connected to the input of a quantizer 15. In fact, a 12 bit word allows, on a linear scale, variation of the amplitude from 1 to 4095 with two unit steps (PCM European law). For the computations carried out by the background noise level estimation circuit 5, it is not necessary to have this precision. This is why we provide a quantizer 15, at the output of 13, which for each 12 bit input word, delivers a word corresponding to the next higher power of 2, this word evidently containing a single digit at "1" all the other digits being at "0". Thus, the quantizer 15 yields a word of decimal value 4096 for all inputs of decimal value between 2049 and 4095, a word of decimal value 2048 for all inputs between 1025 and 2048, a word of value 1024 for all inputs between 513 and 1024, a word of value 512 for all values between 257 and 511. Thus, each word provided by 15 has a single "1", all operations done on this word such as multiplication or division by a power of 2, or comparison with another word, is greatly simplified, can be very rapid and requires relatively simply logical means. The structure of the quantizer is that of a logic circuit designed by an expert in that field.

The quantizer 16 is identical to quantizer 15 and is used to quantize in the same manner the digital words yielded by the averaging filter 14.

Figure 4:
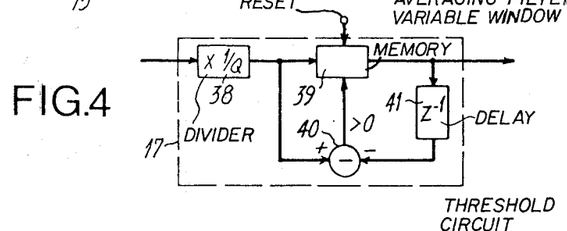
FIG. 4 is a block diagram of a circuit which generates the adaptive threshold, used in the discriminator of FIG. 1.

FIG. 4 shows an example of the realization of the adaptive threshold generation circuit 17. The input of the circuit is connected to the input of a divider 38 which can divide the word received from the quantizer 15 by a coefficient constant Q which is a power of 2. The output of 38 is, on one hand connected to the input of a memory 39, and on the other hand to the + input of a subtractor 40 whose signed output is connected to the write enable of memory 39. The output of memory 39 is one one hand connected to the output of circuit 17 and on the other hand to the input of a delay circuit 41 whose delay is equal to one sampling period. The output of 41 is connected to the − input of subtractor 40. In another way, memory 39 has a zero resetting input CLR (RAZ) which is connected to the "0" output of flip flop 27, FIG. 1.

Subtractor 40 carries out the comparison between the value stored in memory 39 and the last word yielded by divider 38. If the difference obtained is positive, that is, that the last word exceeds the value previously registered, the sign lead of 40 transmits a "1" which triggers in 39 the writing of the last word instead of the previous one registered. It is thus apparent that circuit 17 keeps in memory the word of largest value obtained from 15, but divided by Q. Each time flip flop 27 goes to state "0", that is to the speech state, memory 39 is reset to zero. Later in this description, we shall see that we chose for Q the decimal value 128, that is $2^7$.

Figure 5:
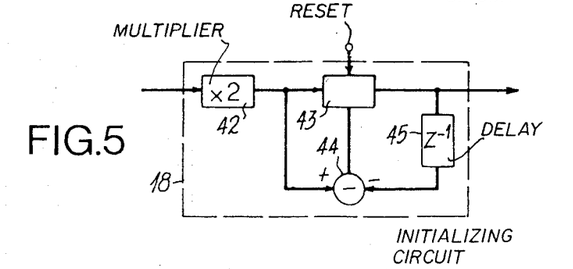
FIG. 5 is a block diagram of an initializing circuit for an averaging filter used in the discriminator of FIG. 1.

FIG. 5 shows a realization example of the initialization circuit 18. The input of the circuit is connected to a times 2 input of a multiplier 42 which multiplies by 2 the word received from the quantizer 15. The output of 42 is, on one hand, connected to the input of a memory 43, and on the other hand to the + input of a subtractor 44 whose signed output is connected to the write enable input of memory 43. The output of 43 is connected, on one hand to the output of circuit 18, and on the other hand to the input of a delay circuit 45 whose delay is equal to one sampling period. The output of 45 is connected to the − input of subtractor 44. In other respects memory 43 has one zero resetting CLR(RAZ) input, which is connected to the "0" output of flip flop 27, FIG. 1.

Subtractor 44, memory 43 and circuit 45 operate as their counterparts 40, 39 and 41 of FIG. 4, that is, that memory 43 always has in memory the largest value coming from multiplier 42, that is the word of largest value coming from quantizer 15, but multiplied by 2. The resetting to zero of 43 is accomplished at the same time as the resetting to zero of 39, that is when flip flop 27 goes to the speech state. The choice of the 2 times multiplying coefficient for 38 will be justified in the following description.

The comparator 19 is a logic circuit which provides a signal when the values of the words, applied to its two inputs, coming from quantizer 15 and 16 are equal, on condition that it has been activated by its control input connected to the "0" output of flip flop 27, FIG. 1, that is at the transition to the speech state. The signal provided by 19, when its two inputs are equal is precisely a word equal to the common value.

Memory 20 is provided so that its content will take on the value delivered by comparator 19, each time this signal is delivered, and to store it until the next signal is produced by 19.

Figure 6:
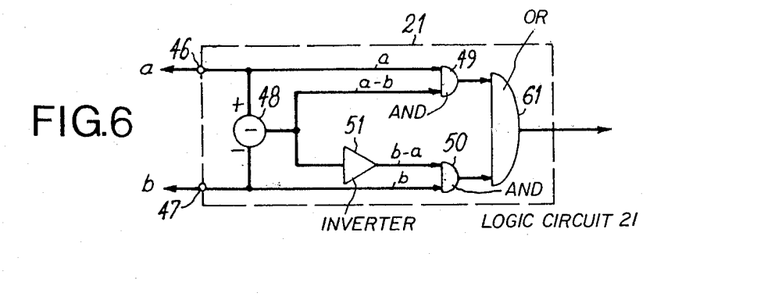
FIG. 6 is a block diagram of a logic circuit used in the discriminator of FIG. 1.

The logic circuit 21 is a control circuit which delivers at its output a signal equal to the largest of the signals respectively applied to its two inputs. The structure of such a circuit is left to a man skilled in the art. FIG. 6 is shown as an example of such a circuit. The two inputs 46 and 47 are respectively connected to the + and − inputs of a subtractor 48. Furthermore, input 46 is connected to the first input of an AND gate 49 and the input 47 to the first input of AND gate 50. The sign output of 48 is connected to the second input of 49 and to the input of an inverter 51 whose output is connected to the second input of 50. The outputs of gate 49 and that of gate 50 are respectively connected to the inputs of an OR gate 61 whose output is that of logic circuit 21.

Logic circuit 22 is identical to 21 and operates similarly.

The minimum threshold memory 23 is a read only memory, the contents of which is a digital word of value 4, which represents for input words of 12 bits, a maximum level of 4095, an attenuation of 60 dB with respect to this maximum level. We shall describe below that this minimum threshold has a level of −60 dBM.

It should also be noted that the signals produced by outputs "1" and "0" of flip-flop 27 are presumed to be, in respect to their action on the discriminator circuits, to be impulses emitted at changes of state.

In the description of the discriminator operation to follow, we distinguish three parts: the first illustrating considerations on speech signals and line noise, the second concerning the operation in the absence of noise and the third concerning a link with high noise.

We recall first that, in a telephone conversation, each speaker is connected to a listener and consequently, on the average, the apparent activity of a link in a given direction is only 50%, the turns of speaker and listener being normally distributed evenly between the two parties. Thus, for a link, we establish the speech time or speech state to be 50% and the silence time or silence state to be 50%.

If we consider the speech signal by itself, we observe that it is interspersed by brief periods of silence due to the process of generating physiological signals. The sounds created by the expulsion of air from the lungs and the vibrations of the vocal cords are separated by silent intervals, during which the complete physiological system prepares its action mechanism to produce the next sound.

These intervals, which are the intersyllabic silences, the inter word silences, the "break" which precede the generation of plosive phonems such as /t/, /p/, /b/, of greatly varying durations, from a few milliseconds to many hundreds of milliseconds, however representing a sizeable average portion of the speech time.

Thus, in phrases read by many speakers, this duration varies from 10% to 35% with an average that can be reasonably set at approximately 20%. In an actual conversation, this number reaches approximately 30%. The discriminator of this invention is anticipated to detect a large portion of these silences inserted in the time of speech.

We must consider that the silences defined above correspond to an ideal hypothesis where all the electronic circuits are perfect and where all sound intakes are equally perfect. In fact, when one party become a totally silent listener, the local ambient noise surrounding him erases the notion of "silence" on the telephone line. Furthermore, the electronic and mechanical imperfections of the link itself create parasitic signals which are well known, that is to say electric noise. We shall consider below only those noises which have a certain dynamic stability, whatever their origin, be it acoustical or electrical.

The dynamic variations of speech at the level of the duration of one syllable are considerable. We pick up variations of 40 to 60 dB between voiced sounds /o/, /a/ and unvoiced sounds /s/, /f/, for example, in a few to tens of milliseconds.

Among the background noise considered as dynamically stable, we consider electrical noise and permanent ambient noises such as ventilation blowers. In practice these noises are characterized by an electrical signal whose average amplitude level remains stable when the duration of analysis is of the order of duration of one syllable, from a few milliseconds to tens of milliseconds.

Figure 7:
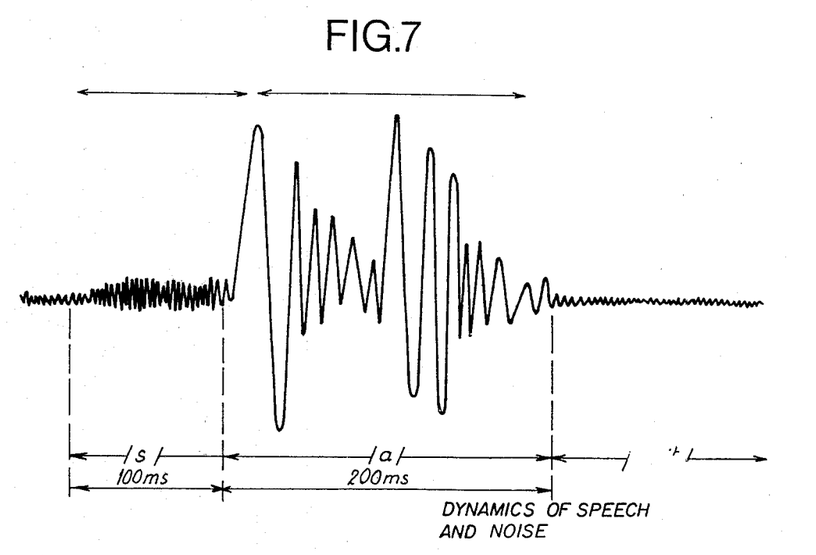
FIG. 7 is a diagram illustrating the dynamics of the speech and noise signals treated by the discriminator of FIG. 1.

FIG. 7 gives an illustration of the dynamics of speech and noise signals, with the representation of a period of noise followed by a non-voiced sound such as an /s/, followed by a voiced sound such as an /a/, with again a period of noise. For reference, we put as abcissa the average time duration of the non-voiced and voiced sounds indicated, that is 100 to 200 ms.

Figure 8:
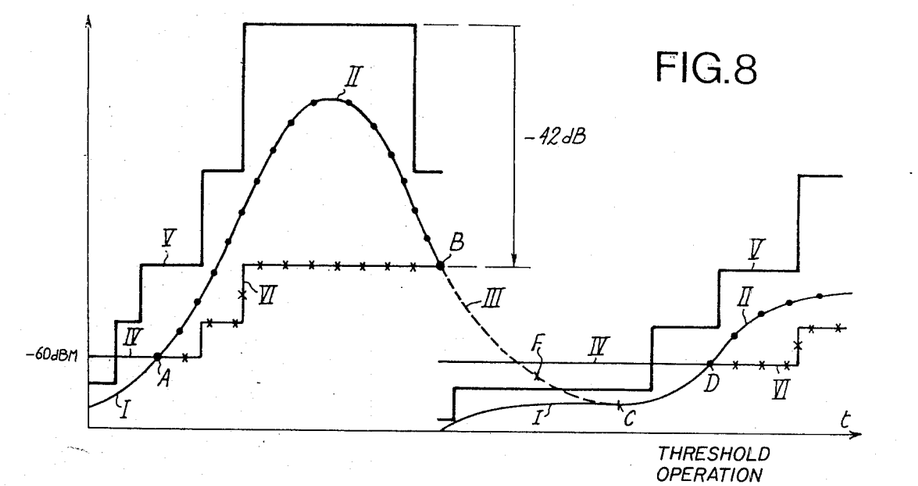
FIG. 8 is a diagram which enables the illustration of the operation of the discriminator of FIG. 1, particularly upon reaching the speech-silence threshold decision level and the silence-speech threshold decision level.

FIG. 8 is a diagram expressly simplified to help describe the operation of the discriminator of FIG. 1 by supposing the absence of noise. We placed as abscissa the time and as ordinate the average amplitudes.

Curve I represents the output signal of filter 11, for which coefficient P is implied to be 64, which is transmitted to comparator 7, when switch 12 is in the position indicated, that is in the silent state. Curve II represents the output signal of filter 10, for which coefficient P is taken equal to 2, which is transmitted to comparator 7, when switch 12 is in the working position, that is in the speech state. Curve III represents the output signal of filter 10 after switch 12 goes from the speech state to the silent state. Curve IV represents the value of the signal at the output of AND gate 26. Curve V represents the output signal of quantizer 15 and curve VI the output signal from the adaptive threshold generation circuit 17. Sequencer 37 for the variable window filter 13 is anticipated to yield, after each reset to zero, the following values for P:

| 1 2 2 4 4 4 4 8 8 . . . 8 | 16 16 . . . 16 | 32 32 . . . 32 | 64 . . |
|---|---|---|---|
| 4 times | 8 times | 16 times | 32 times |

The hypothesis of no noise on a link becomes concrete, as we shall see below, by a level at the output of memory 20 less than or equal to that at the output of memory 23, that is $-60$ dBM. As a result the output level of circuit 26 is during a period of silence equal to $-60$ dBM, which curve IV indicates.

As indicated by the curves of FIG. 8, it is presumed that at the initial instant, link 2 is in the silent state which lasts up to a point A. When the level of the speech signal, which has appeared on the link, shortly before the time of point A, is sufficiently large that the output signal of filter 11, curve I, exceeds the output of OR circuit 25 which is equal to the output of 26, the comparator 7 triggers flip flop 27 from the "1" state to the "0" state. As a result circuit 8 becomes closed and allows the signal to pass from 2 to 9. In other respects, at the moment of change of state, switch 12 becomes active and the signal applied to comparator 7 is now the signal coming out of 10 whose time constant is much smaller and thus varies rapidly with the speech signal—curve II. In other respects, filter 13 which was operating during silence as a narrowband filter with P=64, has its sequencer 37 reset to zero such that it now begins to operate as a wideband filter gradually becoming narrower. Quantizer 15, which as mentioned earlier operates by excess, produces, as the speech signal evolves, the staircase signal of curve V. Circuit 17 yields the signal of curve VI which increases as long as that of curve V increases with a difference of $-42$ dB corresponding to a division by $2^7$, and remains constant when the signal of curve V decreases or also remains constant.

In circuit 21, the signal produced by 17 is obviously large and, since the AND circuit 24 has been opened by 27 at "0", the level produced by 17 is applied by 25 to the second input of comparator 7. When the output level of 10, curve II, becomes, when decreasing, less than or equal to that of 17, curve IV, that is at point B, the comparator 7 causes flip flop 27 to change from the "0" state to the "1" state. As a result, after delay time 28, circuit 8 cuts the link between 2 and 9. In other respects, switch 12 becomes inactive and the initial average of filter 11 applied to its input 35, with 34 momentarily closed, is equal to zero. As filter 11 has a fairly large time constant, its output level will increase slowly, which is translated by curve I after the time at point B. In particular this curve remains below the −60 dBM level. Curve III which extends curve II corresponds to the output level of 10 which is no longer used. At point C the levels of 10 and 11 are equal if the signals applied at 3 consist only of noise. In other respects, the signal level at output 13 takes on the quantized value just larger than that of point C—curve I.

When a speech signal again appears on line 2, at point D, we find the same sequence of operation as after point A.

It is apparent that discriminator 1 of FIG. 1, enables, in the case of weak noise, the detection of intersyllabic silences of short duration. In effect, starting from a sound or syllable of high level, the circuit enables, without degrading the perception of this sound to set a high speech signal detection threshold which truncates part of the end of the signal representing this syllable. Subjectively, the sound will have been perceived during the high amplitude period and, when its attentuation is sufficient (−42 dB), any extension of the electrical signal becomes useless to audible perception. In fact, the delay introduced by circuit 28 permits a delay of this cutoff, for example of 4 ms, with respect to the time of point B. But the other switches or resettings to zero occur at the instant of point B.

If, after point B, we retained as silence-speech threshold the level of point B, and if the next sound was a weak non-vocal sound, this threshold would prevent its coding and transmission, which would bring about an intolerable degradation. This is one of the inconveniences found in single threshold silence detectors.

This is why, starting from point B, the silence-speech threshold is brought back to a much weaker value of −60 dBM, in the case considered. The discriminator thus enables the coding and transmission of invoiced sounds of weak amplitude.

Thus, the discriminator for which the speech-silence threshold is clearly higher than the silence-speech threshold, with the two thresholds being active at different instants, as shown in FIG. 8, allows for no loss of time at the end of a high level voiced sound while assuring the later possibility of transmitting weak unvoiced sounds.

Figure 9:
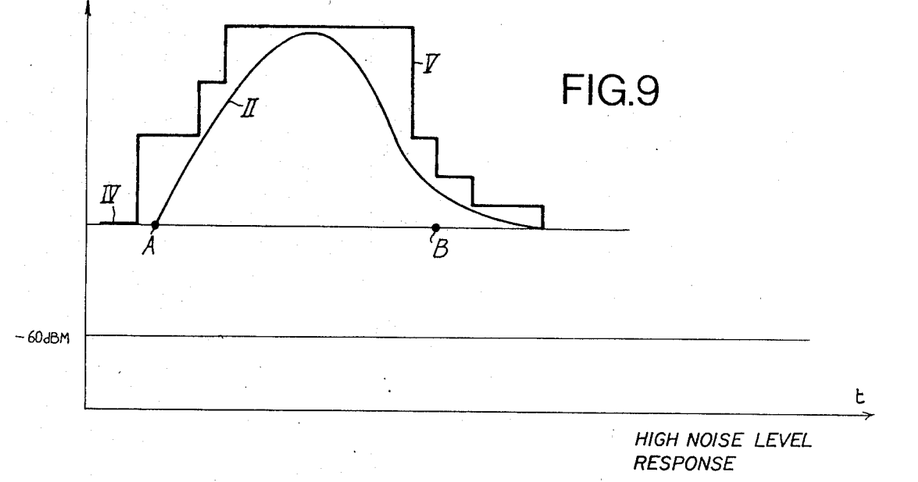
FIG. 9 is a diagram which enables the illustration of the operation of the discriminator when the link is subjected to a noise of high level.

FIG. 9 is a simplified diagram permitting the description of the operation of the discriminator of FIG. 1, by presuming a significant noise level on link 2, this noise level being for example greater than =42 dBM, that is, always above the output level of circuit 17. We shall see in the following description how this noise level is available at the output of memory 20.

Consequently the levels of the output signals of AND circuits 24 and 26 are equal. Thus, the discriminator operates practically with a single threshold. The level of this threshold is applied to the second input of comparator 7. As shown in FIG. 9 it is no longer possible to go to the silent state after a syllable a long time after point B is practically at point C, at time in which a new phonem can be produced if the party concerned remains the speaker. If additionally we consider the delay introduced by 28, in the case where a subscriber is speaking, there is practically no more silence. In practice there will be silence only when this subscriber becomes the listener.

It is thus apparent that in the absence of noise, the detection of short silences is possible which allows one to consider the link to be active only 30% of the time. However, with a considerable noise level the link appears to be active 50% of the time.

Figure 10:
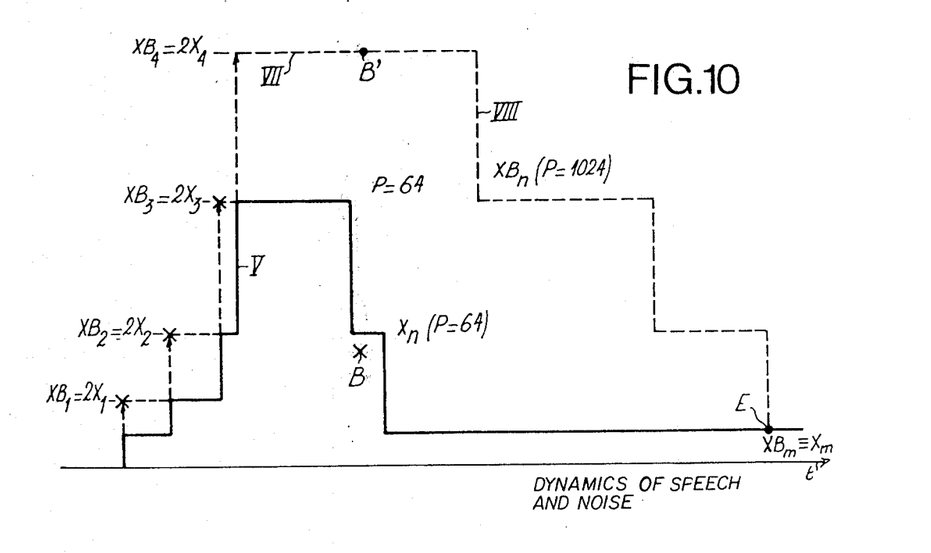
FIG. 10 is a diagram which enables the illustration of the operation of the discriminator of FIG. 1, particularly which concerns the noise level evaluation circuit which it contains.

FIG. 10 is a diagram illustrating how circuit 5 allows fixing of the noise level.

Curve V again represents the variations in the output level of the quantizer 15, which is transmitted to the doubling circuit 18, during the speech state. In fact, circuit 18 is simply reset to zero at every change in the silence-speech state. The output level of circuit 18 is thus indicated by curve VII. This output level of 18 is, during this time applied to terminal 35, FIG. 2, of the averaging filter 14, in which contact 34 is closed. In this way the initial value of filter 14 is prescribed during the silence state by output 18. As a result output 14 delivers the same level as is the case with the quantizer 16 because the level of output 15 is quantized. At the time corresponding to point B, the speech-silence transition, which corresponds to point B' on curve VII, the contact 34 of 14 is open by the output "1" of flip flop 27, whose initial value of the average is not further imposed in 14 which operates normally on the signal which it receives from 3. The time constant of filter 14 is chosen much longer, with P=1024, than that of filter 13 where P=64. As a result, after of a period of speech, the decay of the output level of 14, as well 16, will be much slower during a silent period than that of the output level of 13 and 15. The level at the output of 16 thus varies as shown in curve VIII.

When the signal on link 2 consists merely of noise, after a certain period of time of the order of the time constant of filter 14, the output levels of 13 and 14, that is to say those of 15 and 16 become equal thus arriving at a point E of FIG. 10. At this moment, the levels of the inputs to the comparator 19 are equal thus delivering the word of the last noise level to memory 20 which registers the new word in the location of the last. The comparator 19 is activated only after each change to the speech state since we know that normally the noise level on the link varies slightly. Yet, it is interesting to recompute the noise from time to time, which is done by circuit 5 especially since the ambient noise can vary during a conversation.

The operation of circuit 5 for the computation of the noise level can be explained as follows. We know that the noise is distinguished by an amplitude level which is relatively stable in time. Thus, an estimate of the average amplitude of the noise by an averaging filter will be more stable as the number of terms P on which the average is computed becomes larger. This can equally well be understood by considering the notion of very narrow band filtering. This is why, at least one filter of 5, namely 14 does its computations based on 1024 terms.

However, the speech signal presents large dynamic fluctuations at a rapid rate. Filtering with a medium bandwidth of 20 Hz corresponding to a window of P=64 terms corresponds to a vocal excitation period of 8 milliseconds. Each voiced sound being formed of many of these periods, the estimate will thus be constant for a given sound and will express the average level of each sound. The non voiced sounds resemble more closely the configuration of noise signals.

Thus, by comparing the estimates of average amplitudes obtained on two filters having windows of very different widths such as 13, where P=64 after the beginning of the speech signal and 14, where P=1024, we can extract some information on the nature of the probable signal. When the two estimates converge to the same value, such as in E, it can only be a background noise almost constant in amplitude. The quantization of the output values of the filters enables very definite convergences on a reduced number of possible values and generally faster convergences at that.

The detection of a background noise by this method can only be done over a long period of time. In particular this duration should be long enough such that the level obtained by adding a unvoiced sound to a considerable noise does not risk being estimated as a noise level alone.

In order that as the progress through the different output levels of filters 13 and 14 a single equality point E should exist, the filter 14 has its initial value controlled by the doubling circuit 18 in such a way that at the beginning of the convergence period, in B', the level of 14 is higher than that of 13 and remains so up to E.

In the preceeding description, we considered successively, the case in which the noise is very weak, less than $-60$ dBM and the case in which it is very high. In the intermediate case, the operation is practically the same as in the case of low noise with the difference being that the level of curve IV is now, above $-60$ dBM, fixed by the output of comparator 19, through memory 20.

We must also note, by referring once again to FIG. 8 that after point B, due to the delay introduced by 28, the coding and transmission of speech is maintained up to point F corresponding to the delay. In the preferred example of the invention, the delay of 28 is taken equal to 4 milliseconds which is approximately one half of one vocal excitation period, or also a time corresponding to 32 sampling periods in a PCM system. If at the end of this delay the point F is below curve IV, the silence is thus said to be confirmed; in the opposite case there is once again a transition to the speech state in such a way that coding and transmission have not been interrupted.

The interest in choosing the filter 13 with an increasing window width stems from the fact that, during the growth of the speech signal, the level of the output of the filter follows the behaviour of the signal better. Of course, when using the 1 to 64 sequence mentioned above for the sequencer 37, the output level fluctuates according to the sequence chosen, but this fact is attenuated because the output signal of 13 is not used directly, only that of quantizer 15 which has a limited number of possible values.

Figure 11:
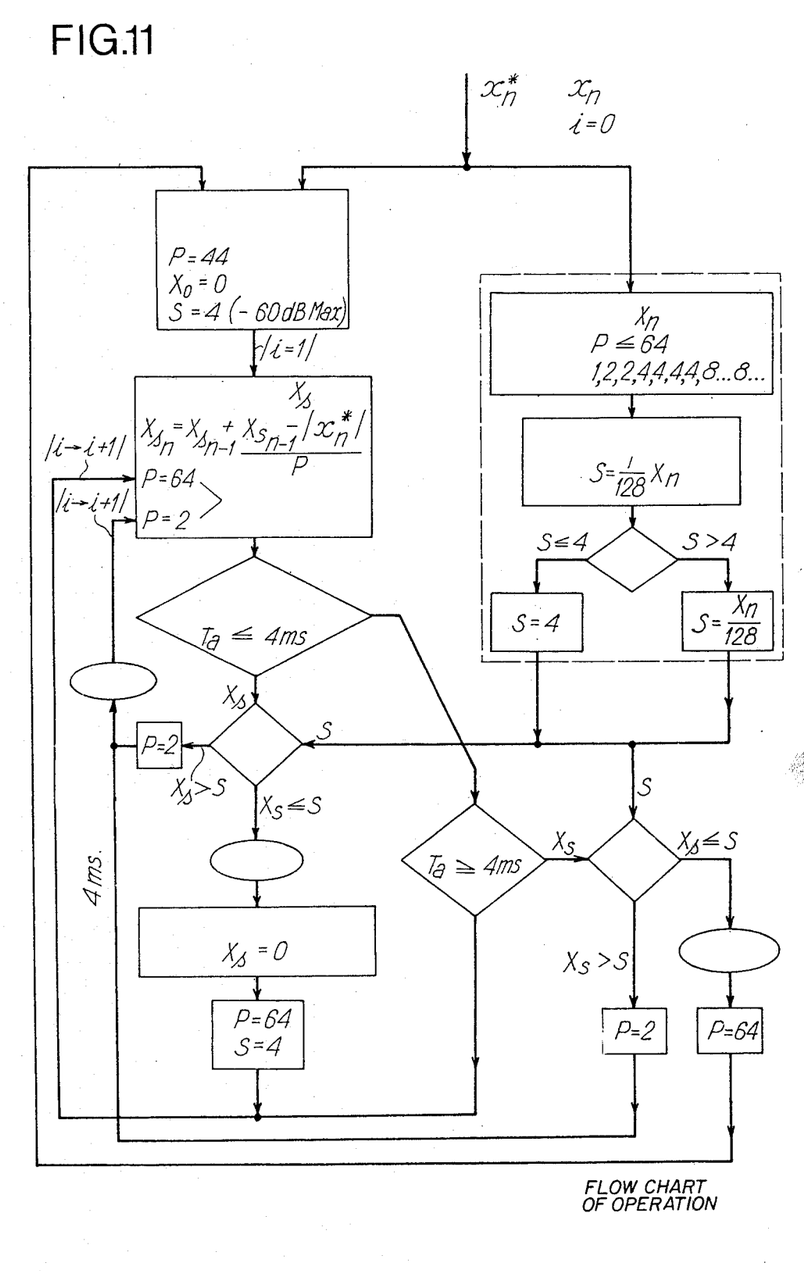
FIG. 11 is a flow chart illustrating the operation of the discriminator of FIG. 1 given the hypothesis that the noise level on the link is low.
Figure 12:
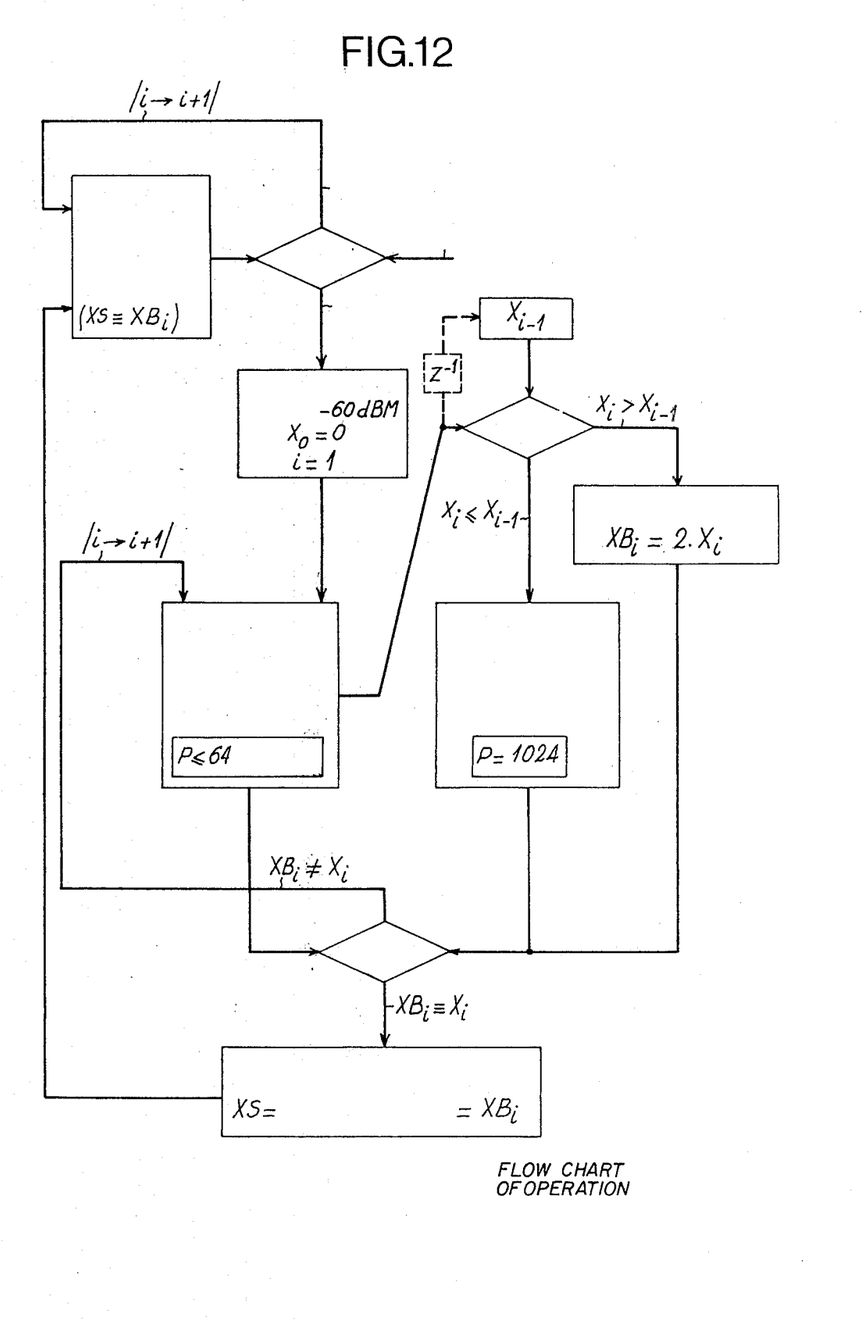
FIG. 12 is a flow chart illustrating the operation of the discriminator of FIG. 1 given the hypothesis that the noise level on the link is relatively high.

We must also note that the group of circuits of FIG. 1 constitutes only one realization of the discriminator in which discrete digital logic components are used. It should be understood that a part of the numerical operations and logical decisions carried out and described above can be programmed in a computing machine such as a microprocessor. This is why we have indicated in FIG. 11 a flow chart of the discriminator operation and in FIG. 12 a flow chart of the operation of the noise level evaluation circuit.

Figure 13:
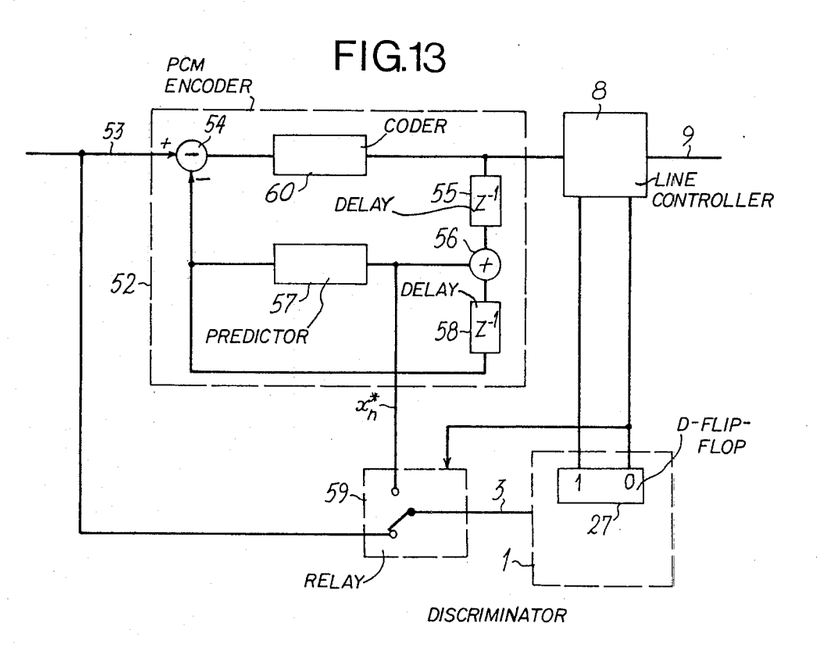
FIG. 13 is a block diagram diagram of a discriminator in accordance with the invention, associated with a PCM differential coder in such a way as to simplify the signal procedures between the transmitting station and the receiving station.

FIG. 13 is a block diagram of a discriminator of the invention associated with a differential PCM coder 52. It is known that, in a differential PCM coder, the input signal of the PCM link, for which it is assumed that the samples have been coded into 12 bit words on a linear scale, is applied by 53 to the + input of a subtractor 54 whose output is connected to the input of a coding circuit 60, whose output is connected to a circuit 8 on one hand and to the input of a delay circuit 55 on the other hand. The output 55 is connected to one input of an adder 56 whose output is connected to the input of a predictor 57. The output of 57 is connected on one hand, to the input of subtractor 54 and on the other hand to the second input of adder 56 through the delay circuit 58. The output of 8 is connected to line 9.

In other respects, the output of adder 56, which delivers the reconstructed signal $x_n^*$, is connected to the make contact of a relay 59 whose moving contact is connected to tap 3 of the discriminator 1. In the discriminator 1, the "0" output of flip flop 27 is connected to the control input of relay 59. The break contact of 59 is connected to input 53.

Finally, we recall that at the receiving end, the decoder which can decode the signals transmitted by 52 is comprised of a predictor identical to 57 at the input of which we have the signal $x_n^*$. For reference purposes, we can find descriptions of differential PCM coders and decoders corresponding to the French Patent Application No. 78 34709 filed Nov. 27, 1978 by the present applicant.

Given the states of the relay 59, it is apparent that, during a period of speech, the signal applied to the discriminator 1 is $x_n^*$. The estimates of the level with respect to the threshold are done on this signal. Thus, if at the receiving end we associate the same discriminator with the decoder, the receiving end discriminator will carry out the same evaluations, and at the two extremities the discriminators will detect the passage through point B, FIG. 8, because identical signals are processed. At this point of time, suppression of transmission in 8 occurs but the signalling indicating the stoppage of transmission need not be transmitted to the receiving end, which knows that transmission is to be cut off.

During the period of silence, the discriminator receives directly the signal from link 53 and operates on this signal in the manner described earlier. Upon going from silence to speech, signalling information is transmitted to the receiving end. It is thus apparent that the circuit of FIG. 13 allows a reduction by half of the signalling information transmitted.

By referring again to FIG. 10, it should be noted that operation is provided in which 14 is initialized, by 18, to double its value only at the instant where the quantized output of 15 increases. Afterwards, filter 14 computes freely starting with this initial value, its output value which is quantized by 16. With this variation in operation, which necessitates slight modifications to the circuits of FIG. 1, these modifications being within the skill of a person skilled in the art, one can obtain more rapid convergence of the output levels of 15 and 16.

The embodiments of the invention in which an exclusive property or privilege is claimed are defined as follows:

1. A speech/silence discriminator comprising first filter means with a very wide band and having an input connected to an input of means of said discriminator and an output connected to a first input of a switch, second and narrow band filter means having an input connected to the input of a discriminator and having an output connected to a second input of the said switch; said narrow band second filter comprising one zero resetting input connected to respond to a "1" output of a two state circuit, a first quantization circuit means, divider means, third filter means with variable bandwidth having an input connected to the input of the discriminator and an output connected to an input of said first quantization circuit means the output of which is connected to the input of said divider means having an output connected to an input of a second switch, said second switch having another input connected to the "0" output of the said two state circuit, first comparator means, the output of the first switch being connected to a first input of said first comparator means and an output of the second switch being connected to a second input of said first comparator means, an output of a said first coparator means being connected to an input for controlling the change of state of said two state circuit, the "1" state output being activated to indicate the silent state in a speech signal, the output of the second filter being connected to the output of the first switch, memory means having an output connected to the output of the second switch, and the "0" state indicating the speech state in a speech signal, means for connecting the output of the first filter means to the output of the first switch and the output of the divider means to the output of the second switch, the bandwidth of the third filter decreasing as a function of time to a minimal bandwidth after it is set to a maximum bandwidth responsive to each activation of the "0" output state.

2. A speech/silence discriminator in accordance with claim 1, characterized in that it is comprised of circuit means for evaluating a noise level, an output of said circuit means being connected to the second input of the second switch, when said circuit means has an output level which is higher than the level of said memory.

3. A speech/silence discriminator in accordance with claim 2, characterized in that the output of the said noise level evaluation circuit means also has an output connected to the first input of the second switch when the output level of the noise evaluation circuit means is higher than the output level of the divider.

4. A speech/silence discriminator in accordance with claim 2 characterized in that said noise level evaluation circuit means has a fourth filter with a relatively narrow band and an input connected to the input of the discriminator and an output connected to the input of a second quantizer means, said quantizer means having an output connected to a first input of a second comparator means and to an input of a multiplier means, said multiplier having a zero setting input connected to the "1" state output, fifth filter means with a very narrow band input connected to the input of the discriminator and an output connected to an input of a third quantizer means, said third quantizer means having an output connected to a second input of the said comparator means, second memory means having an input connected to an output of said second comparator means and an output which constitutes the output of the said noise level evaluator, the output of said multiplier means being connected to the input of said fifth filter means as long as said two state circuit remains in the state "0" and being disconnected when the two state circuit is in the "1" state, said comparator circuit means having one activation input connected to be energized when the two state circuit is in the "0" output state.

5. A speech/silence discriminator in accordance with claim 4 characterized in that said third and fourth means and the first and second quantizers means are interchangeable.

* * * * *